United States Patent [19]

Sheardown

[11] 3,880,184
[45] Apr. 29, 1975

[54] CONTROL VALVES FOR FLUIDS
[76] Inventor: John Maxwell Sheardown, 62. High St., Old Harlow, Essex, England
[22] Filed: Dec. 20, 1973
[21] Appl. No.: 426,696

[30] Foreign Application Priority Data
Dec. 20, 1972 United Kingdom............. 58767/72

[52] U.S. Cl. ..... 137/454.2; 137/625.33; 137/625.37
[51] Int. Cl. ........................................ F16k 25/00
[58] Field of Search........... 137/454.2, 454.3, 454.4, 137/454.5, 454.6, 625.33, 625.37

[56] References Cited
UNITED STATES PATENTS

| | | | |
|---|---|---|---|
| 1,739,864 | 12/1929 | Schardein | 137/454.5 |
| 2,612,337 | 9/1952 | Maynard | 251/340 |
| 3,330,294 | 7/1967 | Manning et al. | 137/454.6 X |
| 3,487,435 | 12/1969 | Sheardown | 137/454.6 |
| 3,713,457 | 1/1973 | McInnis | 251/368 X |

Primary Examiner—Arnold Rosenthal
Attorney, Agent, or Firm—Wenderoth, Lind & Ponack

[57] ABSTRACT

A valve for controlling the flow of at least one supply of a fluid having a body, an apertured sleeve member fitted with sealing members and washers mounted as an assembly in the body, a plunger mounted in the body for axial sliding movement relative to the body and the sleeve member, and a fluted bush member secured to the inner end of the plunger having a peripheral shoulder engaging one of the washers of the sleeve assembly. The fluted bush member provides "waterways" for the fluid to pass internally to the apertures in the sleeve member and the peripheral shoulder facilitates the withdrawal of the sleeve assembly from the valve body and insertion thereof into the valve body in correct axial alignment of the individual parts thereof and also to provide a guide for centering the plunger relative to the sleeve member and the elements within the valve body.

4 Claims, 3 Drawing Figures

PATENTED APR 29 1975 3,880,184

CONTROL VALVES FOR FLUIDS

BACKGROUND OF THE INVENTION

This invention relates to a valve for controlling the flow of at least one supply of fluid, of the kind comprising an assembly of at least one apertured sleeve member fixedly mounted in a valve body or housing with the interposition of annular sealing members and washers and a plunger or spool member mounted in the body for axial movement relative to the body and the sleeve member and having at its inner end an annular abutment means for facilitating withdrawal of the assembly as a unit out of the valve body or housing.

The invention is particularly applicable to water taps for washing and cleansing installations both industrial and domestic, including wash basins, baths, sinks, showers and the like.

SUMMARY OF THE INVENTION

The invention aims at improving the construction and arrangement of the abutment means so as not only to facilitate the withdrawal of the assembly from and insertion thereof into the valve body in correct axial alignment of the individual elements thereof, particularly the sealing members and washers, but also to provide a guide for centering the plunger or spool member relative to the sleeve member and the elements within the valve body or housing.

To this end, the present invention includes a valve for controlling the flow of at least one supply of a fluid, comprising a valve body, an assembly of at least one apertured sleeve member mounted in the valve body with the interposition of annular sealing members and washers, a plunger mounted in the body for axial movement relative to the body and the sleeve member, abutment means constituted by a fluted bush member secured on the inner end of the plunger, and a peripheral shoulder on the bush member engaging one of the washers of the sleeve assembly.

The flutes are preferably defined by axial ribs or lands provided in the periphery of the bush member and form "waterways" for the fluid to pass internally to the apertures in the sleeve member. The peripheral shoulder is formed by at least some of the ribs being radially extended.

The fluted bush member may be screwed on to the inner end of the plunger or spool member or held in position thereon by means of a circlip. Preferably, the bush member is made of a plastics material of suitable hardness.

BRIEF DESCRIPTION OF THE DRAWING

In order that the invention may be more readily understood, reference is made to the accompanying drawings which illustrate diagrammatically and by way of example one embodiment thereof, and in which.

DETAILED DESCRIPTION OF THE DRAWING

Figure 1:
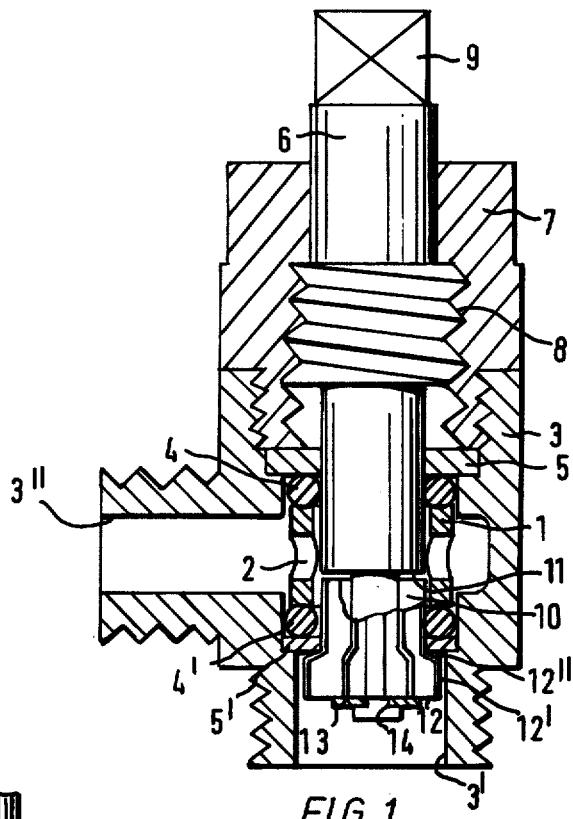
FIG. 1 is a part-sectional view of the valve in accordance with the invention, showing the plunger in its outermost position, i.e., with the valve fully open.
Figure 2:
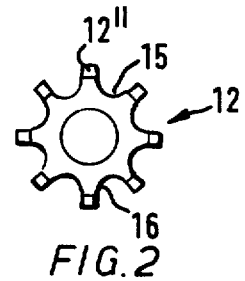
FIG. 2 is a plan view of one embodiment of the fluted bush member.

Referring to the drawings, the control valve comprises a sleeve member 1 which is provided with a plurality of circular apertures 2, uniformly distributed over the periphery of sleeve member 1, and which is fixedly mounted in a valve body or housing 3 having an inlet 3' and an outlet 3" for the fluid. At each end, the sleeve member 1 respectively co-operates with a resilient sealing member in the form of an O-ring 4;4' which in turn are respectively supported in the valve body 3 by means of washers 5 and 5'. The sleeve member 1, O-rings 4,4' and the washers 5,5' form an assembly. A valve plunger or a spool member 6 is mounted in the valve body 3 by means of a gland nut 7 which is screwed into one end of the value body 3 and which serves to guide the plunger or spool member 6, by means of complementary screwthreads 8, axially relative to the valve body 3 and within the sleeve member 1 with the O-rings 4;4' and washers 5 and 5'.

One end portion of the plunger or spool member 6 projects outwardly from the gland nut 7 and is provided with a squared end 9 to which a knob or the like operating member (not shown) is conveniently secured. The portion of the length of the valve plunger 6 extending into the interior of the valve body 3 has adjacent its end a portion 10 of reduced diameter which forms an annular shoulder 11, which constitutes a control edge adapted to co-operate with the innermost O-ring 4' to open or close the valve and thus to allow or prevent the flow of the fluid through the valve, upon the axial displacement of the valve plunger 6 relative to the sleeve member 1. In the position of the plunger 6 illustrated in FIG. 1 the control edge is spaced apart from the O-ring 4', and the valve is fully open.

A cylindrical bush 12 of plastics material surrounds the reduced diameter portion 10 of the valve plunger 6 and at its one end abuts the annular shoulder 11 and at its other end, that is adjacent the free inner end of the portion 10 of the valve plunger 6, is supported against a circlip 13 disposed in a circumferential groove 14 at the free end of the portion 10 of the valve plunger 6. Adjacent the inner end of the valve plunger 6 the bush 12 has an enlarged diameter portion 12' which thus forms a shoulder 12" by means of which the bush 12 is adapted to co-operate with the innermost washer 5' supporting the O-rings 4'. The outer periphery of the bush is fluted, that is provided with axial grooves 15 which are longitudinally bounded by radial ribs or lands 16. The grooves 15 in the outer periphery of the bush constitute "waterways" for guiding the fluid to the interior of the apertured sleeve member 1.

Figure 3:
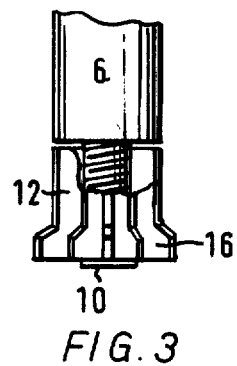
FIG. 3 is a fragmentary view of the inner end of the plunger with another embodiment of the fluted bush member.

As shown in FIG. 3, the fluted bush 12 may alternatively be provided with a screwthread for screwing on the reduced diameter portion 10 of the inner end of the plunger 6 which is provided with a co-operating thread. In this case the circlip 13 is dispensed with.

On withdrawal of the valve plunger 6 from the valve body 3, for the purpose of dismantling the valve, the fluted bush 12 engages by its shoulder 12" the adjacent washer 5' and thus enables the withdrawal of the assembly of the washers 5;5', O-rings 4;4' and the apertured sleeve member 1 in one operation and in substantial axial alignment. By virtue of the axial bracing of the assembly no skewing of the washers or O-rings is possible, so that no jamming of these elements can occur. Furthermore, the fluted bush 12 provides a guide for centering the inner end of the plunger 6 relative to the innermost washer 5' and O-ring 4' of the assembly.

Insertion of the assembly into the valve body 3 is similarly facilitated by ensuring that the elements 4;4', 5;5' and 1 are kept in substantial axial alignment.

The bush member 12 may alternatively be made of metal.

Whilst the preferred embodiment of the invention has been described with reference to a valve for controlling the flow of one supply of fluid, in which a simple valve plunger co-operates with only one O-ring for valving purposes, the invention is not limited to such application, but may be applied to other valve constructions, for example in which a valve spool co-operates with a plurality of O-rings for controlling the flow of more than one supply of fluid, such as is common in a mixing valve.

I claim:

1. A valve for controlling the flow of at least one supply of a fluid, said valve comprising:
   a valve body;
   an assembly of at least one apertured sleeve member mounted in said valve body with the interposition of annular sealing members and washers;
   a plunger mounted in said body for axial movement relative to said body and said sleeve member; and
   a fluted bush member secured on the inner end of said plunger and having axially extending lands or ribs spaced apart circumferentially and defining a plurality of flutes, each land or rib having an axial portion cooperating with a sealing member or washer for centering said plunger relative to said assembly, and at least some of said lands or ribs being extended radially at one end to form a substantially radial shoulder engageable with an innermost sealing member or washer of said assembly for facilitating co-axial extraction of said assembly as a unit out of the valve body or housing.

2. A valve as claimed in claim 1, wherein said fluted bush member is screwed on to the inner end of said plunger.

3. A valve as claimed in claim 1, wherein said fluted bush member is secured on the inner end of said plunger by a circlip.

4. A valve as claimed in claim 1, wherein said fluted bush member is made of plastics material.

* * * * *